United States Patent Office 3,199,991
Patented Aug. 10, 1965

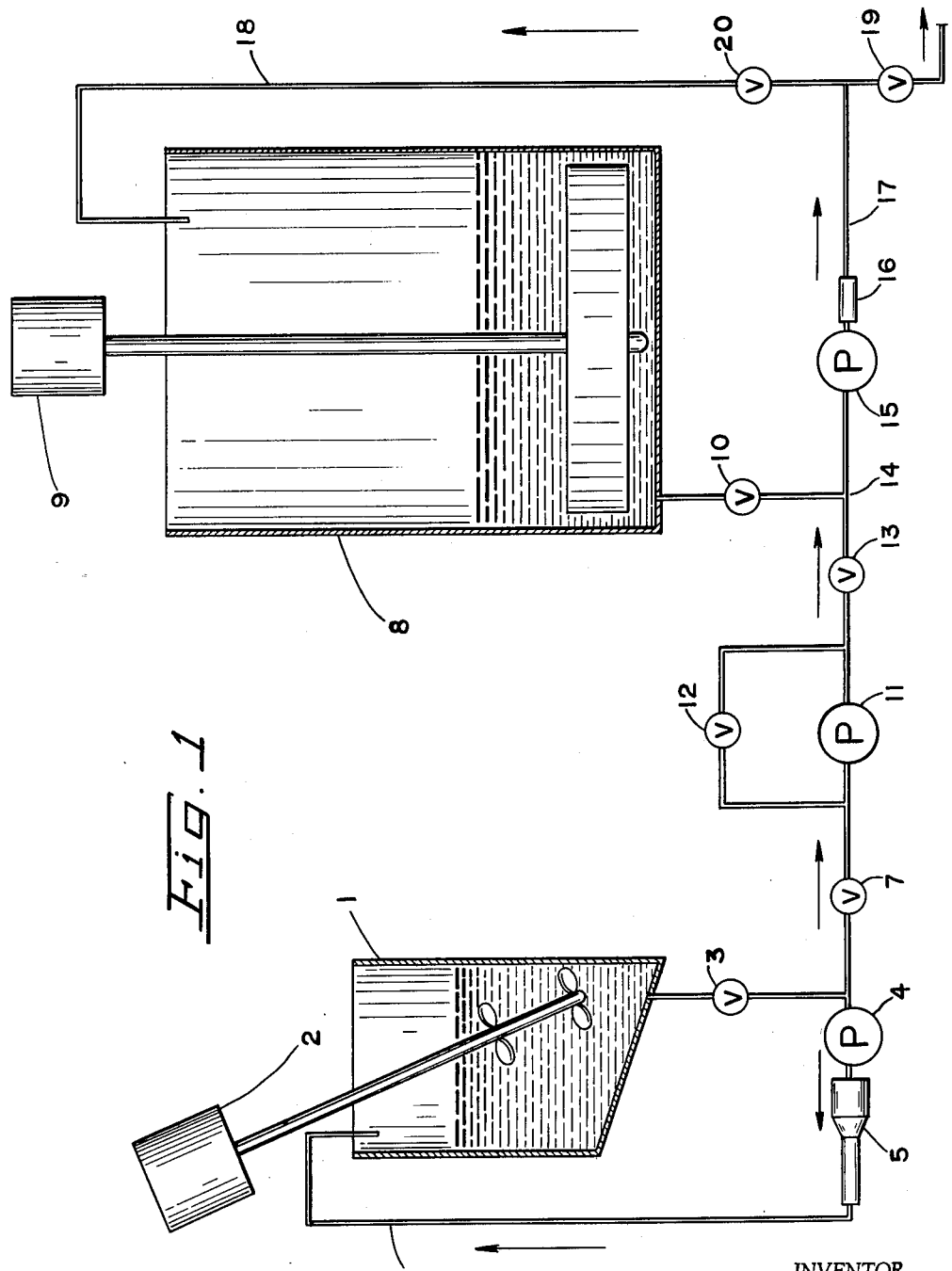

3,199,991
BLACK NEWS INK AND PROCESS FOR ITS MANUFACTURE
William T. Schelling, Orinda, William C. Parle, Berkeley, Donald H. Cook, San Rafael, and Archibald M. Erskine, Berkeley, Calif., assignors to The California Ink Company, Inc., San Francisco, Calif., a corporation of Delaware
Filed Dec. 4, 1961, Ser. No. 156,755
15 Claims. (Cl. 106—32)

This invention relates to carbon black printing inks and more particularly to carbon black emulsion news inks of the water-in-oil type which are particularly adapted for printing from high speed rotary presses.

Inks of the usual type for the high speed rotary presses used in modern newspaper printing comprise essentially carbon black pigment dispersed in non-aqueous mineral oil. Although giving fairly satisfactory results in the printing process, these inks have the very undesirable property of producing a pronounced black misting in the atmosphere in the vicinity of the press, known in the trade as "fly." This "fly" of the ink appears to be formed at the point of the breaking of the ink film in the nip of the rollers, the breaking of the film causing an electrostatic charge to be induced on the microscopic ink particles which are thrown off in the form of an aerosol. The electrostatic charge tends to stabilize this aerosol which subsequently floats in the air as a black mist to the great discomfort of the press men and other workers in the newspaper printing plants.

Many attempts over a long period of years have been made to eliminate the "fly" by various changes in composition of the above described inks but with almost complete lack of success.

As a result of this invention a practical means has been discovered of introducing into news inks a highly polar substance, namely water, which dispels the electrostatic charge at the point of film rupture and consequently reduces the "fly." Emulsion inks of the water-in-oil type have been disclosed in the prior art but they have not been practical for various reasons, such as undesirable effects upon printing properties, instability of the emulsion, or uneconomic factors in the process of their manufacture.

It is a principal object of this invention to develop a practical carbon black water-in-oil emulsion news ink having the property of markedly reducing the "fly" or misting when used on high speed rotary printing presses.

A further object of this invention is to produce in such a water-in-oil emulsion ink a high degree of emulsion stability under variations of temperature in storage, as well as under printing conditions.

It is a further object of this invention to develop superior printing properties in the emulsion ink, including clearer and blacker printing, a reduction in the filling of ink in the half-tone engravings in the printing plate, and reduced penetration of ink into the paper resulting in less "strike-through" of printing from the back of the sheet.

An additional object is to develop a simple process for the manufacture of a water-in-oil emulsion ink in which carbon black in a non-dusting pellet form may be utilized as an economic raw material.

It is another object of the invention to develop a practical and economical water-in-oil emulsion ink in which the pigment may be carbon black of the furnace type, instead of all channel black or mixtures of channel and furnace black, as is common practice with non-emulsion inks.

Other objects of the invention will be evident from the following description and specification.

The foregoing objects are accomplished by preparing an aqueous colloidal dispersion of the carbon black and subsequently combining this dispersion with a treated mineral oil, the conditions being such as to emulsify the water in the oil phase and simultaneously transfer the carbon black to the oil phase with retention of its colloidal condition.

More specifically, carbon black is dispersed, preferably from the pellet form, in water by means of a tannin colloiding agent in conjunction with mechanical dispersion means which apply extreme hydraulic turbulence by mechanical means, by ultrasonic vibrations or otherwise, as distinguished from mere stirring or any grinding action. The aqueous colloidal dispersion is then combined and emulsified with a mixture of a mineral oil, an oil soluble water-in-oil emulsifying agent, a transfer agent to assist transfer of the dispersed carbon from the water to the oil phase, and a stabilizing agent to stabilize the carbon black when finally in the oil phase so that it maintains its colloidal condition.

In the drawing, FIG. 1 is a schematic illustration of a form of apparatus for preparing the printing ink hereof.

Tannin dispersing agent is dissolved in water in tank 1, fitted with a mixer 2. Carbon black is then added to the tannin solution in tank 1 and the aqueous mixture is continuously circulated from the bottom of tank 1 by way of conduit 3 through a pump 4 which forces the slurry through an ultrasonic generator 5 that provides extreme hydraulic turbulence. This turbulence breaks up and disperses the carbon black, and the mixture is returned to tank 1 by means of conduit 6. The dispersion is continuously circulated from the bottom of tank 1 through the ultrasonic generator 5 until the desired colloidal dispersion of carbon black in water is obtained.

Tank 8 is employed to form a treated oil phase. This tank is fitted with a mixer 9, and the mixer is used to mix mineral oil, an emulsifying agent, the transfer agent and the stabilizing agent to form a treated oil mixture.

The treated mineral oil mixture is run out of tank 8 through valve 10. Aqueous dispersion is simultaneously pumped from tank 1 through valves 3 and 7 by means of a pump 11. The aqueous dispersion of carbon black and the treated mineral oil mixture merge at pipeline juncture 14. The rate of flow of the aqueous dispersion of carbon black is controlled by valve 13 and bypass valve 12.

The mixture of carbon black dispersed in the aqueous phase and the treated mineral oil is then passed through a pump 15 which feeds the mixture into an ultrasonic generator 16. The violent hydraulic action of the ultrasonic generator forms a water in oil emulsion. The emulsion is passed through conduit 17 and upward through conduit 18 and then back down into the tank 8. By this means, the aqueous phase is gradually introduced into the circulating treated mineral oil to completely emulsify the two phases and provide the final ink. The finished ink is pumped through opened control valve 19 into storage.

The process and product of this invention are described in more detail under the following headings.

AQUEOUS COLLOIDAL DISPERSION OF CARBON BLACK

An aqueous solution of tannin as a dispersing or colloiding agent is prepared by mixing the tannin in water. An alkali, preferably ammonia, is advantageously included in the aqueous tannin solution to neutralize the free phenolic groups of the tannin and provide a pH of between about 8.5 and 9.0. It has been found that this pH range is preferable for efficient dispersion of the carbon black in the tannin solution, although a pH range from 7 to 10 may be used. The carbon black is added to this solution by stirring, or by any simple mechanical mixing means, and the coarse mixture is subjected to extreme hydraulic turbulence until a colloidal dispersion of the carbon is obtained which passes substantially completely through a 325-mesh sieve, openings 44 microns (National Bureau of Standards Series).

Any type of carbon black may be used, such as channel black or furnace black, or mixtures of various types. While the fluffy, dusty form of black may be used as the starting material, the process is particularly valuable in making possible the utilization of pelleted, relatively dust-free blacks. Also, in processes heretofore employed for making news inks it has been necessary to use a substantial amount of channel black rather than the less expensive furnace black in order to obtain a satisfactory dispersion. However, in the method hereof the carbon in the ink may be composed entirely of furnace black.

In general, any of the tannins may be utilized as the colloiding agent for providing the desired dispersion of carbon black in water. The term tannin or tannins as employed herein refers to the polyphenolic substances comprising glucosides of tannic acid, which are found in the wood and bark of trees, such as oak, chestnut, hemlock, mangrove and wattle. A particularly suitable and economical type of tannin colloiding agent is quebracho, which is obtained by aqueous extraction of the wood of the *Schinopsis balansae* or *Schinopsis iorentzii* species of South American tree. Mangrove bark extract is another example of an excellent tannin colloiding or dispersing agent.

The mechanical conditions of extreme hydraulic turbulence in the dispersion step are important in conjunction with the colloiding action of the tannin. It has been found that a particularly effective device for efficient dispersion of carbon black in the presence of an aqueous tannin solution is the ultrasonic disperser of the so-called "liquid whistle" type. In this machine mechanical means are used to force a high pressure jet of the suspension against a knife edge, where powerful oscillations of ultrasonic frequency are set up. These oscillations cause disruption of carbon black pellets and pigment aggregates in general. It has also been found possible to obtain similar results by elimination of the knife blade, the disrupting effect then being produced by the combined action of the liquid jet and the condition of extreme turbulence within the discharge chamber. Other types of dispersion equipment which may be used include the various forms of so-called "high kinetic energy mills," commercial types being known as the "Kady Mill" and "Jet Mill."

In the above described colloidal dispersing step substantially all the carbon particles are reduced to the colloidal range, defined as, approximately 1 micron ($10^{-4}$ cm.) as the high limit to 1 millimicron ($10^{-7}$ cm.) as the low limit. Sedimentation studies by means of the ultra-centrifuge have shown that at least about 90 percent by weight of the carbon black in the aqueous dispersion is below 1 micron in particle size and about 85 percent is between 0.1 micron and 1.0 micron.

The resultant aqueous colloidal dispersions can be prepared with high concentrations of carbon as illustrated by the following Table I which gives range in parts by weight of the essential components in the aqueous colloidal dispersion of carbon black per 100 parts by weight of dispersion.

*Table I*

|  | Parts by weight |
|---|---|
| Water | 94.5 to 60 |
| Carbon black | 5 to 35 |
| Tannin colloiding agent | 0.5 to 5 |

If the amount of carbon black in the aqueous dispersion is substantially below about 5 parts by weight the final ink product does not print as black as is to be desired. On the other hand if much more than about 35 parts by weight carbon black is included in the system, the colloidal dispersion tends to become unstable. The 0.5 part by weight lower limit of the tannin is based upon the amount required to render the tannin effective as a dispersing or colloiding agent. The upper amount of tannin may vary, but the system tends to become upset if a substantial amount more than about 5 parts by weight is used.

THE OIL PHASE

The oil phase of the ink is primarily composed of mineral oil which may comprise paraffinic, naphthenic and aromatic hydrocarbons, or mixtures of these classes. It has been found that a blend of heavy oil of the naphthenic type and a light oil of the paraffinic type is particularly suitable for the product desired.

In order to provide the mineral oil of the ink with certain specific properties designed to control the emulsification of the water and the transfer of carbon black to the oil phase, the following three different agents are incorporated in the mineral oil.

(a) An emulsifying agent is employed which provides a fine water-in-oil emulsion in which the dispersed particles of water are substantially all less than about 2.5 microns in size. It has been found that such emulsifying agents may broadly be classified as mineral oil soluble water-in-oil emulsifying agents. Emulsifying agents having a straight carbon chain of from about 8 to 18 carbon atoms selected from the group consisting of salts and esters are particularly advantageous for this purpose. This type of emulsifying agent may also be specifically classified as mineral oil soluble water-in-oil emulsifying agents which have a straight alkyl or alkylene group containing from 8 to 18 carbon atoms and which are selected from the group consisting of salts and esters of carboxylic, sulfonic, and phosphoric acids. Specific examples of emulsifying agents which provide the desired water-in-oil emulsion in the ink are the oil soluble phospho-lipids, such as soya lecithin, which contains a mixture of the phospho-lipids lecithin and cephalin; magnesium salts of higher fatty acids, such as magnesium tallate; salts of alkylaryl sulfonic acids, such as calcium dodecyl benzene sulfonate; and phosphoric acid esters prepared by the reaction of phosphorus pentoxide with a non-ionic surface active ethylene axide condensation product containing at least one alkyl group having from 8 to 18 carbon atoms. Soya lecithin has been particularly effective as the emulsifying agent.

(b) An oil soluble amine transfer agent is incorporated in the oil mixture to assist in the transfer of carbon substantially completely from the water dispersion to the oil phase of the water-in-oil emulsion ink. Oil soluble amines selected from the group consisting essentially of cyclic amines from pine resin acids, and long chain amines containing an alkyl group having from 8 to 18 carbon atoms have been found particularly effective for providing the desired transfer. Such long chain amines may be primary, secondary or tertiary amines, and the nature of the organic radicals on the secondary tertiary amines is not important as long as at least one radical is a long chain alkyl radical. The term alkyl is used herein to mean the unsaturated alkenyl radical as well as the saturated alkyl radical. It has been found that most efficient transfer is obtained with dehydroabietyl amine which is one of the amines derived from pine resin acids.

(c) The ink also contains an oil soluble stabilizing agent in the oil phase to prevent the carbon black from flocculating or otherwise increasing in particle size after its transfer to the oil phase. Large carbon particles provide undesirable printing properties in the ink. More broadly considered, the function of the agent is to stabilize the system through stabilization of the carbon in its finest state of dispersion, which in turn promotes the maximum stability of the emulsified water.

It has been found that any asphalt, natural or artificial may be employed as the stabilizing agent. Such asphalts are readily soluble in the oil phase. Gilsonite, a natural asphaltic substance, gives particularly desirable results for this purpose. Other asphalts that may advantageously be employed as stabilizing agents include unblown asphalt, blown asphalt, and still bottoms from asphaltic type petroleums.

The range of proportions in parts by weight of the oil soluble components per 100 parts by weight in the oil phase are given in the following Table II

Table II

| | Parts by weight |
|---|---|
| Mineral oil | 98.5 to 85 |
| Emulsifying agent | 0.5 to 5 |
| Transfer agent | 0.5 to 5 |
| Stabilizing agent | 0.5 to 5 |

Unless each of the oil soluble additive components in the oil mixture is present in an amount of at least about 0.5 percent by weight, the component does not efficiently perform its function. On the other hand if these oil soluble additives are present in an amount in excess of about 5 percent by weight, they tend to upset the balance of the system.

COMBINING THE AQUEOUS DISPERSION WITH THE MINERAL OIL ADDITIVE MIXTURE

The aqueous dispersion of carbon black is then mixed under conditions of extreme hydraulic turbulence with the mineral oil, emulsifying agent, transfer agent and stabilizing agent until an ink is provided which is a water-in-oil emulsion that has very small water globules of a size described herein. The components of the ink are most advantageously mixed by adding the aqueous dispersion of the carbon black to the mixture of mineral oil and additive agents. From about 25 to 85 percent by weight of the oil mixture containing additives is mixed with from about 75 to 14 percent by weight of the aqueous carbon black dispersion. Various mechanical means for the emulsification may be employed, such as high speed, turbine type agitators and homogenizers. It has been found that an excellent machine for efficient accomplishment of this step is the ultrasonic disperser, and more particularly the latter in combination with high speed agitation as a preliminary stage.

When the aqueous carbon dispersion, the mineral oil and the oil soluble additive agents are mixed together as described, the carbon in the aqueous dispersion is transferred substantially completely to the oil phase. At the same time a water-in-oil emulsion is formed.

THE EMULSION INK

The resultant ink is a water-in-oil emulsion in which oil is the continuous phase, and water is the dispersed phase. The water phase consists of water globules substantially all less than 2.5 microns in diameter as determined by observations in a phase contrast microscope. The tannin dispersing agent remains partly dissolved in the dispersed water phase and partly absorbed on the carbon black.

The oil phase contains the dispersed carbon black which has been transferred from the aqueous dispersion. At least about 90% of the carbon black is below one micron in primary particle size although a certain amount of flocculation of the primary particles may occur. This fine particle size is important since it provides a blacker ink with less carbon than would be provided by a dispersion of coarser carbon black. Also, the fine colloid dispersion is an important factor in the stability of the ink. In addition to the carbon black, the oil phase contains in solution the oil soluble emulsifying agent, the amine transfer agent, and the oil soluble asphalt stabilizing agent.

Visual observations at 600× magnification in a phase contrast microscope indicate that an emulsion ink made according to this invention, which shows satisfactory printing properties on high speed newspaper presses in addition to reduce misting, is characterized by (1) extremely fine carbon particles dispersed in the outer oil phase and (2) very small, carbon-free water globules of a size less than 2.5 microns as a separate dispersed phase.

In terms of percent by weight, the final ink contains the various components in about the proportions set forth in the following Table III.

Table III

| | Parts by weight |
|---|---|
| Carbon black | 4 to 15 |
| Water phase (including tannin) | 10 to 60 |
| Oil phase (including dissolved additive agents in the proportions set forth in Table II) | 25 to 85 |

This water-in-oil emulsion ink produced by the new process, as described above, is slightly thixotropic in nature and remarkably stable. At ordinary temperature it may be stored indefinitely without change of composition or condition of the emulsion. Storage tests at freezing temperature and at about 125° F. also have shown that the emulsion returns to its original condition at room temperature, that is, the emulsion is stable against reasonable temperature changes encountered in storage and shipping.

Advantages of the ink of this invention as compared to previous news inks include (a) Greatly reduced misting of the ink on high speed presses,
(b) Improved half-tone reproduction,
(c) Clearer and blacker printing,
(d) Reduced penetration into newspaper, resulting in less "strike through" from the back of the sheets,
(e) Reduction of "set-off," by which is meant transfer of the printed ink from its sheets to an adjacent sheet,
(f) Less build-up of heat on the plates and rollers, due to evaporation of the finely dispersed water, and
(g) Easier and faster clean-up of the plates, rolls and presses.

Among the other advantages, the process of this invention makes possible the complete replacement of channel black by the readily available and less expensive furnace black, and makes practical the use of the pellet form of black which greatly reduces the amount of dust released during introduction of the carbon into the ink.

The following are typical examples of the preparation of the news ink hereof:

EXAMPLE 1

This example describes the process of manufacture of the water-in-oil emulsion news ink in the apparatus schematically illustrated in FIG. 1.

In a stainless steel tank 1, fitted with a double propeller type high speed mixer 2, 19.0 lbs. of dry quebracho extract (70 percent tannin content) is dissolved in 996 lbs. of water containing 3.0 lbs. 28 percent ammonia. To this solution is added 250 lbs. of furnace carbon black pellets with rapid stirring.

This preliminary mix of pellets suspended in the quebracho solution is then continuously circulated from the bottom of tank 1, by way of pipe 3, through a high pressure screw-type pump 4, which forces the slurry through an ultrasonic generator of the "liquid whistle" type 5, the latter being operated without the knife blade. The material ejected by this device is returned to tank 1 by means of pipe 6 at the rate of about 10 gallons per minute. The circulation is continued for 5 to 6 hours until the residue retained on a 325 mesh screen is less than 0.015 percent. The pH of the water dispersion is approximately 8.5–9.0.

The treated oil phase is prepared as follows in a separate steel tank 8 fitted with a paddle mixer 9 rotating at 10 r.p.m.

274.1 lbs. heavy oil (gravity 15–17° API, viscosity 90–110 SSU at 210° F.) and 508.4 lbs. light oil (gravity 31–34° API, viscosity 50–60 SSU at 100° F.) are added to tank 8. (The hydrocarbon types in these oils are: Heavy oil—32.5 percent paraffins, 48.7 percent naphthenes and 18.8 percent aromatics; light oil—59 percent paraffins, 32 percent naphthenes and 9 percent aromatics.) The following agents are then added: 37.0 lbs. soya lecithin, 24.6 lbs. dehydro-abietyl amine (known commercially as Rosin Amine D) and 74.0 lbs. of a 25 percent solution of gilsonite in a light mineral oil.

The treated oil is next run out of tank 8 through valve 10 and the aqueous dispersion is simultaneously pumped from tank 1 through valves 3 and 7 by means of a small gear pump 11, the two being mixed by pipe-line mixing at 14. The rate of flow of the dispersion is controlled by valve 13 and by-pass valve 12. A 200 mesh screen is used in the aqueous line prior to the point of mixing.

The aqueous phase is emulsified in the oil phase immediately after mixing the two by passing the mixture through a gear pump 15 which feeds into an ultrasonic generator 16. The emulsion leaving the latter is returned to the top of the oil tank 8 through pipe 18 at a rate of about 6 gallons per minute.

The introduction of the aqueous phase during this circulating procedure requires 3 to 4 hours. After circulating the emulsion another hour through the ultrasonic device, an additional 313.9 lbs. of light oil is added to the ink in tank 8 and circulation from the tank through the ultrasonic device is continued for an additional 3 hours. The finished ink is then pumped through pipe 19 to storage.

The finished water-in-oil emulsion ink, weighing 2,500 lbs. (304 gallons) comprises approximately 40 percent water, 10 percent furnace black and 50 percent oil (including additives). It shows a residue retained on a 325 mesh screen of not more than 0.015 percent, and usually less than 0.005 percent.

The more exact composition of the finished emulsion ink is:

| | Percent |
|---|---|
| Water | 39.84 |
| Ammonia (28%) | 0.12 |
| Quebracho extract | 0.76 |
| Furnace black | 10.00 |
| Mineral oil (heavy) | 10.96 |
| Mineral oil (light) | 32.90 |
| Soya lecithin | 1.48 |
| Dehydro-abietyl amine | 0.98 |
| Gilsonite solution | 2.96 |
| | 100.00 |

The emulsion ink, manufactured as above, showed excellent performance when used for newspaper printing on high speed rotary presses. A series of tests was run on a Goss press at speeds up to 36,000 impressions per hour. The flow of the ink in the fountains and the transfer on the roller, plates and web were excellent. Reproduction of both type and engravings was clear, sharp and black. Misting ("fly") was reduced by a degree estimated as at least 70 percent, compared to the misting from ordinary black news ink. The ink also performed well in conjunction with colored inks, when used either as under or over-print. "Strike-through" (appearance from the back of the printed sheet) of the emulsion ink was reduced by an estimated 50 percent as compared to the "strike-through" of ordinary ink.

A test on a Hoe press running at speeds up to 55,000 impressions per hour also showed the superior printing properties of the new emulsion ink compared to ordinary black news ink. The news ink printed well and was clear and sharp. The misting was reduced by an estimated 85 to 90 percent. "Strike-through" was much less than with ordinary news ink. The fact that the rolls run cooler with the new emulsion ink was observed in this test.

A similar test was made on a vertical Hoe press at speeds of 34,000 to 40,000 impressions per hour. As in the tests above, the printing was clear, sharp and black. Misting was reduced by an estimated 50 to 80 percent. No "filling" of the half-tone plates was observable.

A particle size distribution study was carried out on the aqueous colloidal dispersion, prepared as in Example 1, by means of ultra centrifugation. A Model LH Beckman-Spinco Preparative Ultra Centrifuge with a special swinging bucket type rotor was used. The sedimentation data, when applied to calculations of particle diameters, showed that at least 90 percent by weight of the carbon black was below 1 micron in particle size and at least about 85 percent was between 0.1 and 1.0 micron.

Particle size studies were made on the water globules in the final emulsion ink, prepared as above, by microscopic techniques. The ink was diluted with light mineral oil to one part of ink in 800 parts of oil. Maximum settlement of the water particles was carried out in an American Optical No. 1475 Bright-line Haemacytometer for Phase Contrast Microscopy. Visual inspection at optical magnification of 600 diameters by phase contrast showed substantially all water globules to be less than 2.5 microns in diameter. The particle size was also very uniform.

EXAMPLE 2

Carbon black pellets were shaken vigorously in water with steel balls in metal cans on a shaking machine. Using this method, 59.1 grams furnace black pellets (known commercially as Vulcan 3), 4.5 grams Colombian mangrove bark extract, 0.6 gram 28% ammonia and enough water to give a total of 300 grams were mixed. To the mix was added 3/16 inch steel balls and the can was then shaken 15 minutes. The resulting dispersion was screened through a 325 mesh screen before being used as described below.

A control preparation was made following identical conditions to the above, except for the use of 4.5 grams dry quebracho extract in place of the mangrove bark extract.

The above two aqueous dispersions were emulsified in identical oil mixtures having the following composition:

| | Grams |
|---|---|
| Heavy oil (same as in Example 1) | 15.6 |
| Light oil (same as in Example 1) | 28.9 |
| 25% solution of gilsonite in light mineral oil | 4.2 |
| Soy lecithin | 2.1 |
| Dehydro-abietyl amine | 1.4 |

For each emulsification, 71.6 grams of the aqueous dispersion was added at a moderate rate to the oil phase while the latter was stirred rapidly with a laboratory agitator of the turbine (toothed disk) type. Stirring was continued for one hour, after which an additional 17.8 grams of light oil was added (making a total oil phase of 70.0 grams) and stirring was continued for another half hour.

The final emulsion inks had the following composition: Carbon black 10.0%, water 39.8%, oils 46.2%, and combined additives 4.0%.

The two inks were similar in viscosity and flow properties. They gave a comparable reduction in misting and microscopic examination showed that each consisted of a finely dispersed water phase with good transfer and dispersion of the carbon particles in the oil phase.

Comparison with an emulsion ink made with quebracho extract according to Example 1 also showed closely agreeing properties.

EXAMPLE 3

A mineral oil mixture was prepared with the following composition:

| | Grams |
|---|---|
| Heavy oil (specifications as in Example 1) | 15.6 |
| Light oil (specifications as in Example 1) | 26.8 |
| 25% solution of gilsonite in light mineral oil | 4.2 |
| 50% magnesium tallate (prepared from tall oil containing 68% fatty acids) in light mineral oil | 4.2 |
| Dehydro-abietyl amine | 1.4 |

The aqueous dispersion of furnace black used for preparing the emulsion ink was taken from a large batch prepared as in Example 1. 71.6 grams of this dispersion (containing 19.6% carbon black) was added to the above constituted oil phase while the latter was being stirred rapidly with the laboratory agitator described in Example 2. Stirring was continued for one hour. The total oil phase was then made up to 70.0 grams by the addition of 17.8 grams light oil and stirring was continued for another half hour.

The final emulsion ink had the following composition: Carbon black 10.0%, water 39.8%, oils 46.2% and combined additives 4.0%.

A control test was carried out in exactly the same manner, except for the use of 2.1 grams soya lecithin in place of the magnesium tallate and an increase of the initial light oil to 28.9 grams to compensate for the oil in the soap solution.

The ink made with magnesium tallate as emulsifying agent correspond closely with the control ink made with soya lecithin in viscosity, flow and non-misting properties. Microscopic examination indicated that both inks consisted of very small globules of dispersed water phase and very fine carbon black particles which had been transferred from the water into the oil phase.

EXAMPLE 4

Another ink was made in which all of the following ingredients of the oil phase were blended together at one time:

| | Grams |
|---|---|
| Heavy oil (specifications as in Example 1) | 31.7 |
| Light oil (specifications as in Example 1) | 29.9 |
| 25% solution of gilsonite in light mineral oil | 3.6 |
| 50% magnesium tallate in light mineral oil | 3.6 |
| Dehydro-abietyl amine | 1.2 |

To the above conditioned oil phase was added 52.8 grams of an aqueous dispersion of furnace black (containing 19.2 percent carbon black) taken from a large batch prepared as in Example 1. During addition of the aqueous dispersion the oil phase was stirred rapidly with the agitator described in Example 2. Stirring was continued for one hour after mixing of the two phases.

The final emulsion ink had the following composition: Carbon black 8.3 per cent, water 34.0 percent, oils 53.9 percent and combined additives 3.8 percent.

A control test was carried out in the same manner, using 1.8 grams soya lecithin in place of the tallate soap and increasing the light oil to 31.7 grams.

As in Example 3, the ink made with magnesium tallate as emulsifying agent closely resembled the control ink made with soya lecithin in viscosity, flow and non-misting properties. The microscopic characteristics compared with the control ink were similar to those described in Example 3.

EXAMPLE 5

A conditioned mineral oil phase was prepared with the following composition:

| | Grams |
|---|---|
| Heavy oil (specifications as in Example 1) | 20.5 |
| Light oil (specifications as in Example 1) | 13.7 |
| 25% gilsonite solution in light mineral oil | 5.15 |
| Calcium dodecylbenzene sulfonate | 1.72 |
| Dehydro-abietyl amine | 1.13 |

The calcium dodecylbenzene sulfonate was a product known commercially as Emcol P10–20P (Witco.)

After thorough mixing of the above oil phase, 44.3 grams of an aqueous dispersion of furnace black were added slowly to it with continued stirring. The carbon black dispersion was prepared as in Example 1 and had the following composition:

| | Percent |
|---|---|
| Furnace black | 20.6 |
| Quebracho | 1.5 |
| 28% ammonia | 0.3 |
| Water | 77.6 |

The mixed aqueous and oil phases were stirred at high speed for one hour. An additional 27.8 grams of light oil was added to the mixture and stirring was continued for another one-half hour.

The final emulsion ink had the following composition: Carbon black 8.0%, water 30.3%, oils 57.4% and combined additives 4.3%.

A control test was carried out in exactly the same manner, except that soya lecithin was used in place of the calcium dodecylbenzene sulfonate.

The emulsion ink made with the calcium dodecylbenzene sulfonate as emulsifying agent was comparable in physical properties to the control ink. Microscopic examination indicated that both inks consisted of very small globules of dispersed water phase and very fine carbon black particles transferred to the oil phase.

EXAMPLE 6

A conditioned mineral oil mixture was prepared as in Example 5. In place of the 1.72 grams of calcium dodecylbenzene sulfonate a mixed agent was added consisting of:

1.07 grams phosphoric acid ester prepared by the reaction of phosphorous pentoxide with a non-ionic surface active ethylene oxide condensation product containing a long chain alkyl group (known commercially as "Gafac" RF-210) and 0.65 gram non-ionic dispersing agent from tallow fatty acid An aqueous dispersion of furnace black was added to the conditioned oil phase as in Example 5, and the stirring conditions and incorporation of additional light oil were as in Example 5. The finished composition of the emulsion ink was the same as in Example 5.

A control test was carried out in exactly the same manner, using soya lecithin as emulsifying agent in place of the "Gafac" agents.

The two emulsion inks were closely similar in physical properties and also in appearance when observed in the phase contrast microscope.

EXAMPLE 7

A conditioned mineral oil was prepared with the following composition:

| | Grams |
|---|---|
| Heavy oil (as in Example 1) | 31.7 |
| Light oil (as in Example 1) | 34.4 |
| Unblown asphalt (penetration ASTM at 77° F.) greater than 300; softening point (ring and ball) 80° F. | 0.9 |
| Soya lecithin | 1.8 |
| Dehydro-abietyl amine | 1.2 |

52.8 grams of an aqueous dispersion of furnace black (from a batch prepared as in Example 1), containing 19.2 percent carbon black, was added to the above constituted oil phase following the procedure used in Example 4.

The final ink had the composition: Carbon black 8.3 percent, water 34.0 percent, oils 53.9 percent and combined additives 3.8 percent.

A control test was carried out in which 3.6 grams of a 25 percent solution of gilsonite in light oil was used in place of the asphalt, with a decrease in added light oil to compensate for the oil in the gilsonite.

The two emulsion inks were very similar in viscosity, flow and non-misting properties. They showed under the phase contrast microscope very small dispersed water globules and fine carbon particles which had been transferred from the water to the oil phase.

EXAMPLE 8

A blown asphalt (penetration 17, softening point 232° F.) was substituted for the unblown asphalt in the conditioned oil of Example 7, using the same proportions throughout.

The emulsification procedure and the control test with gilsonite followed the same conditions as in Example 7.

The emulsion ink made with blown asphalt was very similar in viscosity, flow and non-misting properties to the control ink made with gilsonite. Under the phase contrast microscope the two inks showed similar small dispersed water globules and fine carbon particles transferred to the oil phase.

EXAMPLE 9

A petroleum still residue derived from an asphaltic crude oil was substituted for the asphalt in the conditioned oil of Example 8. A control test with gilsonite was made for comparison. The proportions and procedure throughout the two tests followed Examples 7 and 8.

The resulting emulsion ink was close to the gilsonite control ink in viscosity, flow and non-misting properties. The two inks also showed similar microscopic characteristics as to dispersed water globules and fine carbon particles transferred to the oil phase.

EXAMPLE 10

A conditioned mineral oil phase was prepared with the following composition:

| | Grams |
|---|---|
| Heavy oil (specification as in Example 1) | 31.7 |
| Light oil (specification as in Example 1) | 31.7 |
| 25% gilsonite in light mineral oil | 3.6 |
| Soya lecithin | 1.8 |
| Coconut oil amine | 1.2 |

The amine was a commercial product known as Armeen CD (Armour and Company), consisting of 97 percent primary amines and 3 percent secondary amines. The primary amine portion contained alkyl groups from $C_8H_{17}$ through $C_{18}H_{37}$ in the following proportions: $C_8$—7.0 percent, $C_{10}$—6.5 percent, $C_{12}$—53.0 percent, $C_{14}$—19.0 percent, $C_{16}$—8.5 percent, $C_{18}$ (stearyl)—1.0 percent and $C_{18}$ (oleyl)—5.0 percent.

Following the procedure in Example 7, 52.8 grams of an aqueous dispersion of furnace black, prepared as in Example 1 and containing 19.2 percent carbon, was added to the above oil phase under emulsification conditions.

A control test was carried out in which 1.2 grams dehydro-abietyl amine was used in place of the coconut oil amine.

The two inks had the composition: Carbon black 8.3 percent, water 34.0 percent, oils 53.9 percent and combined additives 3.8 percent.

The final inks showed equivalent properties as to viscosity, flow and non-misting. Under the phase contrast microscope they showed similar characteristics as to the very small water droplets and fine carbon particles which had been transferred to the oil phase. The ink made with the long chain amine was also equivalent in these characteristics to an ink made on a large scale, as in Example 1, using dehydro-abietyl amine.

We claim:

1. The method of preparing a water-in-oil emulsion ink which comprises colloidally dispersing carbon black in water in the presence of a tannin dispersing agent; and emulsifying with extreme hydraulic turbulence said dispersion of carbon black in water with an oil-additive mixture comprising mineral oil, an oil soluble emulsifying agent, an oil soluble amine transfer agent to assist transfer of the carbon black from the water to said oil-additive mixture, and an asphalt stabilizing agent thereby transferring the carbon black from the water phase into the oil phase.

2. The method of preparing a water-in-oil emulsion ink which comprises colloidally dispersing carbon black in water in the presence of a tannin dispersing agent and forming a water-in-oil emulsion wherein the carbon black is transferred from the water into the oil phase by intermixing with extreme hydraulic turbulence said dispersion of carbon black in water with an oil additive mixture comprising mineral oil, an oil soluble water-in-oil emulsifying agent having a straight carbon chain of from about 8 to 18 carbon atoms selected from the group consisting of carboxylic, sulfonic, and phosphoric acid salts, carboxylic, sulfonic, and phosphoric acid esters, and mixtures of such salts and esters; an amine transfer agent selected from the group consisting of pine resin acid amines, long chain amines containing an alkyl group having from 8 to 18 carbon atoms, and mixtures of said amines, to assist transfer of the carbon black from the water to the oil-additive mixture, and an asphalt stabilizing agent.

3. The method of claim 2 in which said carbon black is initially in the form of pellets.

4. The method of claim 2 in which said carbon black is furnace black.

5. The method of preparing a water-in-oil emulsion ink which comprises colloidally dispersing carbon black in water in the presence of a tannin dispersing agent; preparing an oil-additive mixture comprising mineral oil, an oil soluble water-in-oil emulsifying agent having a straight carbon chain of from about 8 to 18 carbon atoms selected from the group consisting of carboxylic, sulfonic, and phosphoric acid salts, carboxylic, sulfonic, and phosphoric acid esters, and mixtures of said salts and esters; an amine transfer agent selected from the group consisting of pine resin acid amines, long chain amines containing an alkyl group having from 8 to 18 carbon atoms, and mixtures of said amines, and an asphalt stabilizing agent; and emulsifying said carbon black-water dispersion and said oil-additive mixture until a water-in-oil emulsion has been formed and substantially all of said carbon black has transferrred from the dispersion to the oil-additive mixture.

6. The method of preparing a water-in-oil emulsion ink which comprises colloidally dispersing from about 60 to 94.5 parts by weight water, 5 to 35 parts carbon black, and 0.5 to 5 parts tannin dispersing agent to form a colloidal dispersion of carbon black in water; preparing an oil-additive mixture comprising from about 98.5 to 85 parts by weight mineral oil, 0.5 to 5 parts of an oil soluble water-in-oil emulsifying agent having a straight carbon chain of from about 8 to 18 carbon atoms selected from the group consisting of carboxylic, sulfonic, and phosphoric acid salts, carboxylic, sulfonic, and phosphoric acid esters, and mixtures of said salts and esters, 0.5 to 5 parts of an amine transfer agent selected from the group consisting of pine resin acid amines, long chain amines having a straight alkyl carbon chain of from 8 to 18 carbon atoms, and mixtures of said amines, and from 0.5 to 5 parts of an asphalt stabilizing agent; and emulsifying from about 14 to 75 percent of said colloidal dispersion and from about 25 to 85 percent of said oil-additive mixture until a water-in-oil emulsion has been formed which has as its dispersed phase water globules substantially all less than about 2.5 microns in size and substantially all of said carbon black has transferred from the aqueous dispersion to the oil-additive mixture which forms the continuous phase of said emulsion.

7. The method of claim 6 in which said tannin is quebracho.

8. The method of claim 6 in which said emulsifying agent is soya lecithin.

9. The method of of claim 6 in which said transfer agent is dehydro-abietyl amine.

10. The method of claim 6 in which said stabilizing agent is gilsonite.

11. The method of preparing a water-in-oil emulsion ink which comprises preparing an aqueous dispersion of carbon black by colloidally dispersing from about 60 to 94.5 parts by weight water, 5 to 35 parts carbon black, and 0.5 to 5 parts quebracho until a colloidal dispersion of carbon black in water is formed in which at least about 90% of the carbon is below one micron in primary particle size, preparing an oil-additive mixture by mixing from about 98.5 to 85 parts by weight mineral oil, 0.5 to 5 parts of soya lecithin, 0.5 to 5 parts dehydro-abietyl amine, and from 0.5 to 5 parts of an asphalt stabilizing agent; and intermixing from about 14 to 75 percent of said aqueous dispersion and from about 25 to 85 percent of said oil-additive mixture until a water-in-oil emulsion has been formed which has as its dispersed phase water globules substantially all less than about 2.5 microns in diameter and substantially all of said carbon black has transferred from the aqueous dispersion to the oil-additive mixture which forms the continuous phase of said emulsion.

12. A water-in-oil emulsion ink which consists essentially of a dispersed phase of substantially carbon-free water globules; and a continuous oil phase; said oil phase containing mineral oil; an oil soluble water-in-oil emulsifying agent having a straight carbon chain of from about 8 to 18 carbon atoms selected from the group consisting of carboxylic, sulfonic, and phosphoric acid salts, carboxylic, sulfonic, and phosphoric acid esters, and mixtures of said salts and esters; an oil soluble amine transfer agent selected from the group consisting of amines from pine resin acids, long chain amines containing an alkyl group having from 8 to 18 carbon atoms, and mixtures of said amines; an oil soluble asphalt stabilizing agent; and carbon black dispersed in said oil phase.

13. A water-in-oil emulsion ink which consists essentially of from about 10 to 60 percent by weight of a dispersed phase of substantially carbon-free water globules; from about 25 to 85 percent by weight of a continuous oil phase; and from about 4 to 15 percent by weight carbon black dispersed substantially entirely in said oil phase, said oil phase containing from about 98.5 to 85 parts by weight mineral oil; from about 0.5 to 5 parts by weight of an oil soluble emulsifying agent having a straight carbon chain of from about 8 to 18 carbon atoms selected from the group consisting of carboxylic, sulfonic, and phosphoric acid salts, carboxylic, sulfonic, and phosphoric acid esters, and mixtures of such salts and esters; from about 0.5 to 5 parts by weight of an amine transfer agent selected from the group consisting of pine resin acid amines, long chain amines, and mixtures of said amines; and from about 0.5 to 5 parts by weight of an asphalt stabilizing agent.

14. The water-in-oil emulsion ink of claim 13 in which the water globules of said water phase are substantially all less tman 2.5 microns in diameter.

15. The water-in-oil emulsion ink of claim 13 in which the carbon black is furnace black at least 90% of which has a primary particle size below one micron; and the water globules of said water phase are substantially all less than 2.5 microns in diameter.

References Cited by the Examiner

UNITED STATES PATENTS

| | | | |
|---|---|---|---|
| 1,955,738 | 4/34 | Stubner | 106—262 |
| 2,046,757 | 7/36 | Tucker | 106—307 |
| 2,120,588 | 6/38 | Curado. | |
| 2,432,461 | 12/47 | Vesce | 106—307 |
| 2,450,434 | 10/48 | Voet | 106—29 XR |
| 2,839,412 | 6/58 | Igler et al. | 106—29 |
| 2,891,872 | 6/59 | Voet | 106—32 XR |
| 3,032,430 | 5/62 | Heller | 106—31 XR |

FOREIGN PATENTS

| | | |
|---|---|---|
| 469,559 | 7/37 | Great Britain. |
| 634,835 | 3/50 | Great Britain. |

ALEXANDER H. BRODMERKEL, *Primary Examiner.*

MORRIS LIEBMAN, LESLIE H. GASTON, *Examiners.*